United States Patent
Roca et al.

(10) Patent No.: US 11,738,516 B2
(45) Date of Patent: Aug. 29, 2023

(54) THREE DIMENSIONAL MODEL CATEGORIES

(71) Applicant: Hewlett-Packard Development Company, L.P., Spring, TX (US)

(72) Inventors: Jordi Roca, Sant Cugat del Valles (ES); Jun Zeng, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 46 days.

(21) Appl. No.: 16/963,318

(22) PCT Filed: Mar. 14, 2018

(86) PCT No.: PCT/US2018/022514
§ 371 (c)(1),
(2) Date: Jul. 20, 2020

(87) PCT Pub. No.: WO2019/177606
PCT Pub. Date: Sep. 19, 2019

(65) Prior Publication Data
US 2020/0398495 A1 Dec. 24, 2020

(51) Int. Cl.
*B29C 64/393* (2017.01)
*G06N 20/00* (2019.01)
(Continued)

(52) U.S. Cl.
CPC ............. *B29C 64/393* (2017.08); *G06N 3/08* (2013.01); *G06N 20/00* (2019.01); *G06T 19/00* (2013.01); *B33Y 50/00* (2014.12)

(58) Field of Classification Search
CPC ........ B29C 64/393; G06N 20/00; G06N 3/08; G06T 19/00; G06T 15/10; G06T 15/80;
(Continued)

(56) References Cited

U.S. PATENT DOCUMENTS 7,760,201 B2 * 7/2010 Couture-Gagnon .... G06T 19/00
345/581
8,040,355 B2 * 10/2011 Burley .................... G06T 15/04
345/428

(Continued)

FOREIGN PATENT DOCUMENTS

| WO | WO-03042925 A1 | 5/2003 |
| WO | WO-2017023284 A1 | 2/2017 |
| WO | WO-2017200527 A1 | 11/2017 |

OTHER PUBLICATIONS

Vanek J. et al. PackMerger: A 3D Print Volume Optimizer, Computer Graphics Forum, vol. 33, Issue 6, Sep. 2014 [online], [retrieved on Sep. 12, 2018], Retrieved from <http://hpcg.purdue.edu/papersNanekl4CGF.pdf5 , paragraphs 1, 6, 6.1, 7, 7.1, fig. 6.

(Continued)

*Primary Examiner* — Abderrahim Merouan
(74) *Attorney, Agent, or Firm* — SHOOK, HARDY & BACON L.L.P.

(57) ABSTRACT

Examples of the present disclosure relate to a method for processing three dimensional (3D) models. The method comprises categorizing the 3D models into geometrical characteristic categories, creating a geometrical template corresponding to each category, determining a label placement for each geometrical template, assigning a label to each 3D model based on the determined label placement and assigning a packing position to the 3D models based on their corresponding template. The method is such that some categories comprise more than one 3D model.

14 Claims, 6 Drawing Sheets

(51) Int. Cl.
  *G06N 3/08* (2023.01)
  *G06T 19/00* (2011.01)
  *B33Y 50/00* (2015.01)
(58) Field of Classification Search
  CPC . G06T 19/20; G06T 9/001; G06T 2219/2012; G06T 2219/2021; B33Y 50/00
  See application file for complete search history.

(56) References Cited

U.S. PATENT DOCUMENTS

| | | | | |
|---|---|---|---|---|
| 8,515,982 | B1* | 8/2013 | Hickman | G06F 30/17 |
| | | | | 707/758 |
| 9,036,915 | B2* | 5/2015 | Quan | G06V 20/39 |
| | | | | 382/190 |
| 9,916,345 | B1* | 3/2018 | Makadia | G06F 16/58 |
| 10,380,794 | B2* | 8/2019 | Hauswiesner | G06T 7/344 |
| 10,725,452 | B2* | 7/2020 | Elber | G06T 19/20 |
| 2010/0238166 | A1* | 9/2010 | Tamstorf | G06V 30/1988 |
| | | | | 382/218 |
| 2014/0340398 | A1* | 11/2014 | Hickman | G06T 15/10 |
| | | | | 345/420 |
| 2015/0142153 | A1 | 5/2015 | Chun et al. | |
| 2016/0246767 | A1* | 8/2016 | Makadia | G06T 19/00 |
| 2017/0165790 | A1* | 6/2017 | McCarthy | B22F 3/105 |
| 2017/0169340 | A1* | 6/2017 | Asente | G06N 7/005 |
| 2017/0173889 | A1 | 6/2017 | Thomas-Lepore et al. | |
| 2017/0243282 | A1* | 8/2017 | Koulis | G06Q 30/0645 |
| 2017/0372515 | A1* | 12/2017 | Hauswiesner | G06T 7/12 |
| 2018/0024517 | A1 | 1/2018 | Halperin | |
| 2018/0033763 | A1* | 2/2018 | Chen | H01L 23/3128 |
| 2020/0038917 | A1* | 2/2020 | McBride | B41J 11/663 |
| 2020/0398495 | A1* | 12/2020 | Roca | G06N 3/08 |
| 2021/0183128 | A1* | 6/2021 | Miller | G06F 16/50 |

OTHER PUBLICATIONS

Freens Johan P N et al: "Automating the production planning of a 3D printing factory", 2015 Winter Simulation Conference (WSC), IEEE, 2015, pp. 2136-2147.

Kravitz Neal D. et al: "CAD/CAM Software for Three-Dimensional Printing A", JCO Inc., 2018, pp. 22-27.

Yang Jimeng et al: "Survey on artificial intelligence for additive manufacturing", Proceedings of the 23rd International Conference on Automation & Computing, University of Huddersfield, Sep. 2017, 6 pages.

* cited by examiner

THREE DIMENSIONAL MODEL CATEGORIES

BACKGROUND

The making of three dimensional (3D) parts by additive manufacturing or 3D printing involves turning a digital 3D model into a tangible 3D part. Complex 3D parts may correspond to complex 3D models which may consume intensive computing resources to prepare their printing into parts.

BRIEF DESCRIPTION OF THE DRAWINGS

Various example features will be apparent from the detailed description which follows, taken in conjunction with the accompanying drawings, wherein:

FIG. 6b is a schematic representation of a modified data file according to instructions comprised in the example storage medium of FIG. 6a.

DETAILED DESCRIPTION

This disclosure relates to processing three dimensional (3D) models. Three dimensional models may be digital representations or digital files comprising virtual or digital information or data which may be translated into a tangible 3D part for example by printing or by additive manufacturing. In some instances, such 3D models my hold a significant amount of information, for example when they are related to parts having a relatively complex shape. In some cases, such 3D models may comprise data files of more than 100 MB (Megabyte). In an example 3D models may comprise data files of more than 50 MB. In an example 3D models may comprise data files of more than 100 MB. Computational processing of 3D models may be time consuming and consume a significant amount of computing resources or data storage.

Such processing may be impacted if a label should be applied on a part, whereby such label should be assigned to the 3D model corresponding to the part. In some cases, 3D models may be represented by a mesh, and the addition of a label may increase mesh complexity very significantly. In some instances, a number of 3D models should be modified to include a label on the corresponding parts, multiplying sometimes exponentially the computational complexity leading to such a modification of each of the 3D models.

Such processing may also be impacted by the process known as packing. The packing of 3D models is a process aiming at reducing 3D manufacturing time resources by grouping or packing 3D models together in as less manufacturing or printing batches or build envelopes as possible. In an example, a 3D printing batch may correspond to a volume of about 41000 cubic millimeters, the time and amount of material corresponding to a batch being relatively independent of the number of parts included in the batch. In an example, a 3D printing batch is of more than 25000 cubic millimeters. In an example, a 3D printing batch is of more than 40000 cubic millimeters. It may for example be more efficient to have a batch comprising 10 parts, each part occupying a volume of for example 7% of the batch, than having 10 batches, each batch comprising a single part occupying 7% of each of the 10 batches. Packing may take place by combining a plurality of 3D models in a manner may seek to optimize the volume occupied by the plurality of the 3D models in relation to the volume of the batch or, in other words, by increasing the built density of a batch, while maintaining potential constraints such as constraints on an inter part distance.

Potentially computationally intensive processes such as labelling or packing are very different in nature, in that the labelling process may comprise modifying 3D models one by one, while the packing process may comprise relationships between 3D models, for example by packing a first having a convex region facing a second 3D model having a concave region in order to maximize or optimize the number of parts included in a given manufacturing batch. The present disclosure proposes an elegant approach which may greatly simplify both the packing and the labelling, thereby resulting in potentially significant time saving and saving of computational resources. This approach involve using a categorization of models to create templates, whereby both labelling and packing benefit from the same template. Such an approach avoids labelling or packing on a per 3D model basis, and leverages a single categorization process for both labelling and packing.

Figure 1:
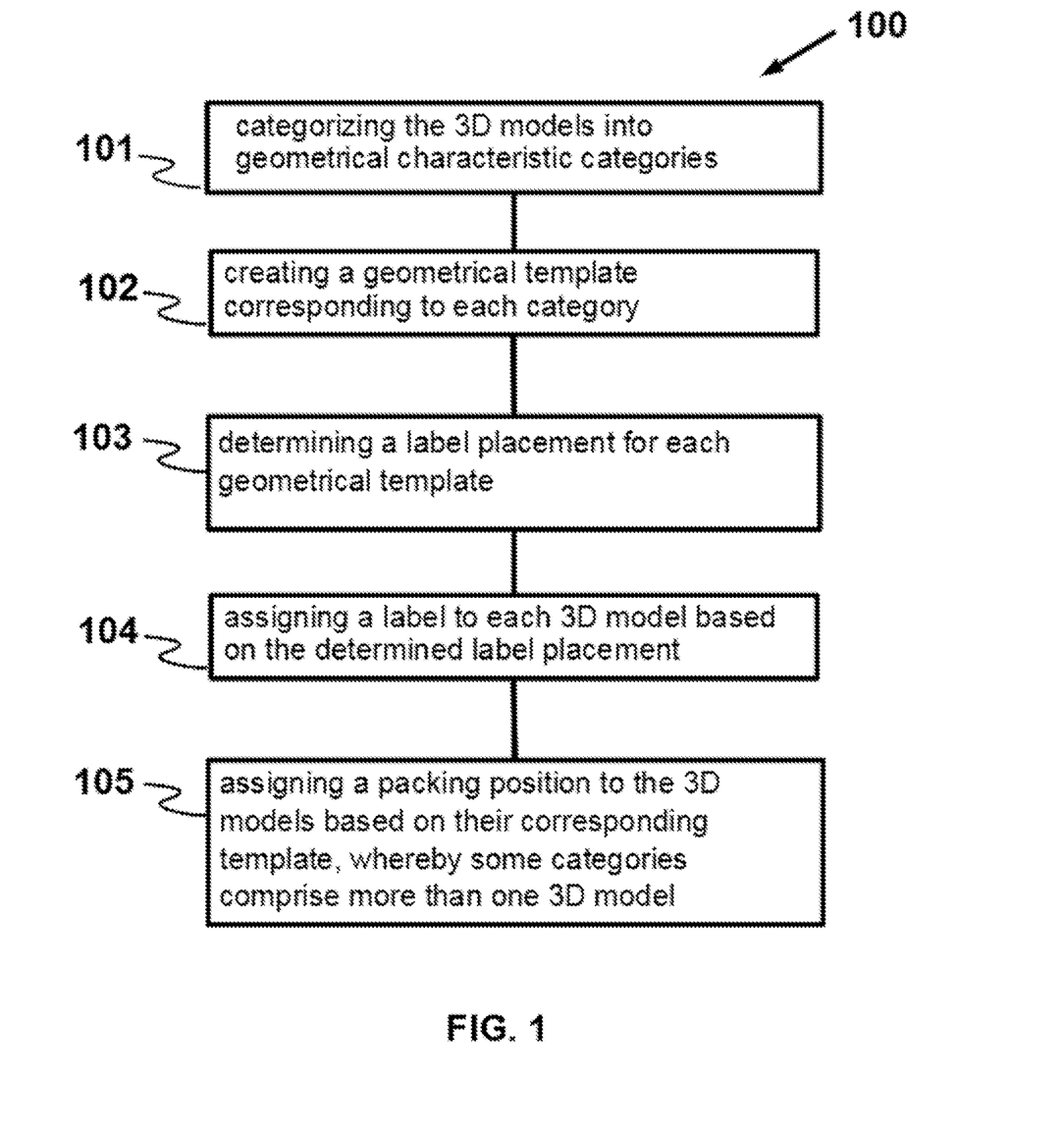
FIG. 1 is a schematic illustration of an example method according to the present disclosure.

FIG. 1 illustrates a method 100 for processing 3D models according to this disclosure. Method 100 comprises in block 101 categorizing the 3D models into geometrical characteristic categories. Categories may be defined in function of geometrical characteristics of a 3D model (or of its corresponding tangible 3D part). In an example, the 3D model is comprising a 3D mesh comprising triangles, the categories being defined in function of the size distribution or number of triangles. Categories may be defined in function of relative similarities between a plurality of 3D models. Categories may be defined by topological features such as the Euler number. The Euler number may for a polyhedron be defined as $X=V-E+F$, whereby V is a number of vertices or corners of the polyhedron, E is the number of edges of the polyhedral and F the number of faces of the polyhedron.

Method 100 comprises in block 102 creating a geometrical template corresponding to each category. A geometrical template corresponding to a category may comprise geometrical commonalities to the 3D models comprised in the category. For example, if the 3D models of the category have a substantially oval shape, the geometrical template may have an oval shape. In an example, the geometrical template may be created in function of an average geometry of the 3D models. In an example, the geometrical template may be created in function of a median geometry of the 3D models. In an example, the geometrical template may be created in function of an envelope or bounding box of the 3D models. In an example, the geometrical template may be created to have a similar volume and area as the corresponding 3D models. Using a geometrical template may have relatively simpler surfaces to compute and position as compared to the surfaces of individual 3D models, thereby facilitating computationally intensive operations.

Method 100 comprises in block 103 determining a label placement for each geometrical template. The determination of such placement on the geometrical template avoids having to operate such placement individually on each 3D model, thereby potentially gaining time as well as a reduction of use of computational resources. In an example, the determination comprises identifying a region of the 3D model suitable to locating a label and marking such region. In an example, such a region is a relatively flat region. In an example, the geometrical template comprises functional regions an structural regions, whereby the functional regions may for example have a mechanical or esthetical function in the corresponding part, whereby the structural functions may have a function of structurally holding together or linking the functional regions, whereby placement of a label on a functional region may negatively impact the related function, whereby the label may be placed in a structural region without function. In an example, label placement is determined by a human designer.

Method 100 comprises in block 104 assigning a label to each of the 3D models based on the determined label placement. Determining a label placement for each geometrical template may permit a very efficient assignment of label on each of the 3D models because a region on which to get a label placed has been determined already using the geometrical template. If for example a geometrical template corresponds to a high number of 3D models, the efficiency of label placement will be multiplied.

Method 100 comprises in block 105 assigning a packing position to the 3D models based on their corresponding geometrical template. The packing position may comprise both a position and an orientation of a 3D model within a manufacturing batch. In an example, a preliminary packing position is determined using the geometrical templates corresponding to each model instead of the 3D models themselves, whereby a final packing position is determined by replacing the geometrical templates by the actual 3D models themselves, in order to for example permit fine tuning of the packing. In an example, geometrical templates occupying a larger volume have a packing position determined prior to determining the packing position of geometrical templates occupying a smaller volume, thereby using the granularity of the 3D models to optimize the occupation of a build space or the volume of a manufacturing batch. In an example, packing is determined according to print mode features associated to respective 3D models. In an example, 3D models being associated to a same print mode are assigned a higher priority for being packed together compared to other 3D models associated to a different print mode.

Method 100 is such that, as stated in block 105, some categories comprise more than one 3D model. The method according to this disclosure becomes increasingly beneficial as the number of 3D models assigned to a category grows, whereby the operations based on the geometrical templates may be leveraged for an increasing number of 3D models, both for labelling and packing purposes.

Figure 2:
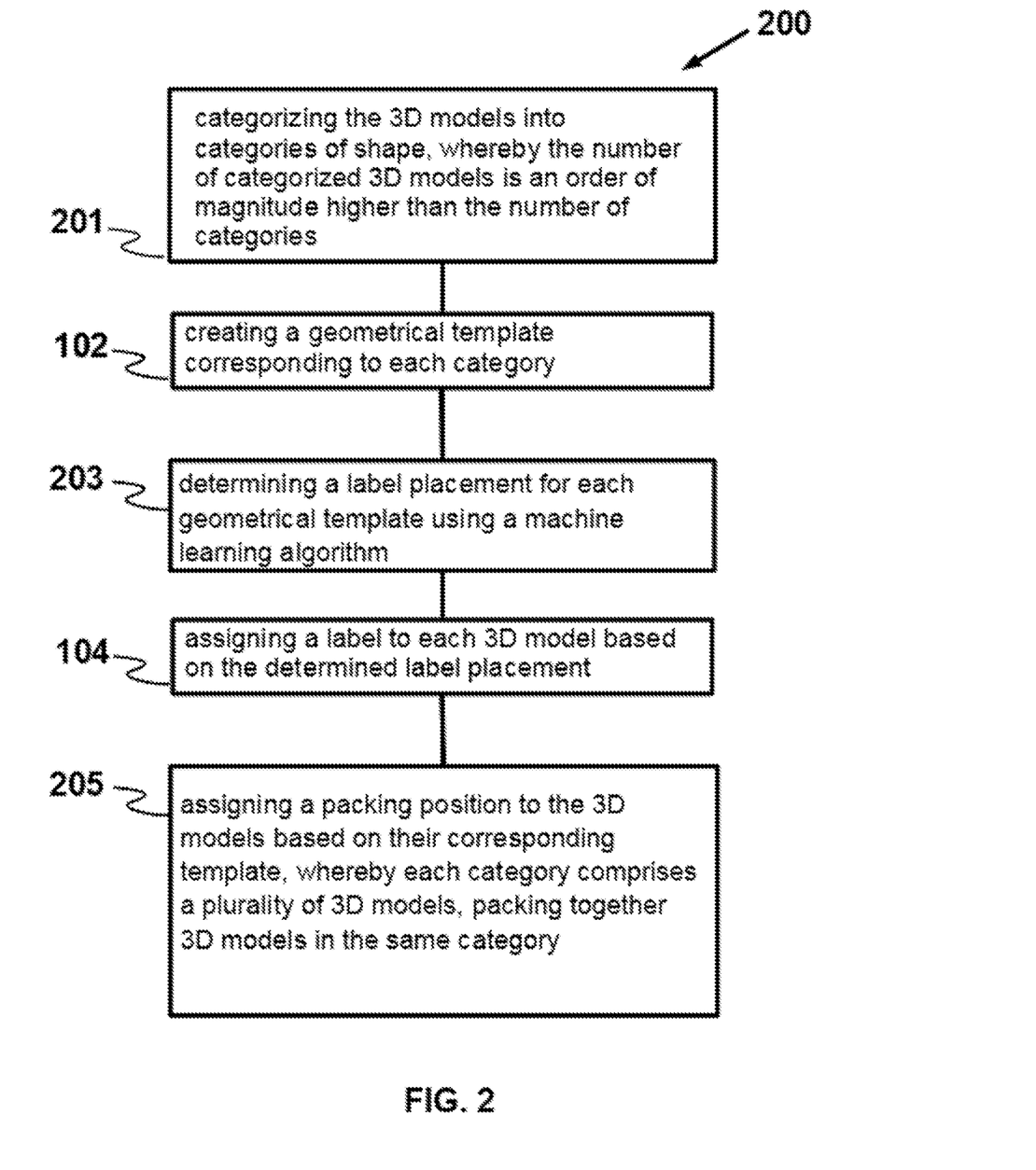
FIG. 2 is a schematic illustration of another example method according to the present disclosure.

FIG. 2 illustrates another method 200 according to this disclosure. Some blocks of FIG. 2 such as blocks 102 and 104 may operate in the same manner as the corresponding blocks of FIG. 1 and are therefore marked with the same reference number and not described in detail.

Method 200 comprises block 201, according to which 3D models are categorized into categories of shape, shape being an example of a geometrical characteristic. This categorization by shape may facilitate identifying a common geometrical template. According to block 201, the number of categorized 3D models is an order of magnitude higher than the number of categories. In such an example, the corresponding packing and labelling operations may each be rendered more efficient by an order of magnitude also when compared to proceeding on a per-model basis instead of operating on a per-category basis, an additional advantage relying on using a common categorization for both the labelling and packing operations. In another example, the number of categorized 3D models is two orders of magnitudes higher than the number of categories. In another example, the number of categorized 3D models is three orders of magnitudes higher than the number of categories. In another example, the number of categorized 3D models is four orders of magnitudes higher than the number of categories.

Method 200 comprises block 203, whereby determining a label placement for each geometrical template uses a machine learning method. In an example, determining a label placement comprises generating a recommendation for a label placement using a machine learning method, providing the generated recommendation to a designer, and modifying the machine learning method if the recommendation is modified by the designer. Use of machine learning may in an initial phase permit to capture the determinations of a human designer into a machine learning method, whereby further phases may apply the machine learning method when a situation is corresponding to an earlier situation captured into the model, progressively capturing an increasing amount of situation which may be leveraged to further accelerate the labelling and packing processes.

In an example, a machine learning method includes a classification method. In an example, the classification method corresponds to one or more of support vector machines (SVM), random forest (RF) and artificial neural networks (ANN).

Figure 3A:
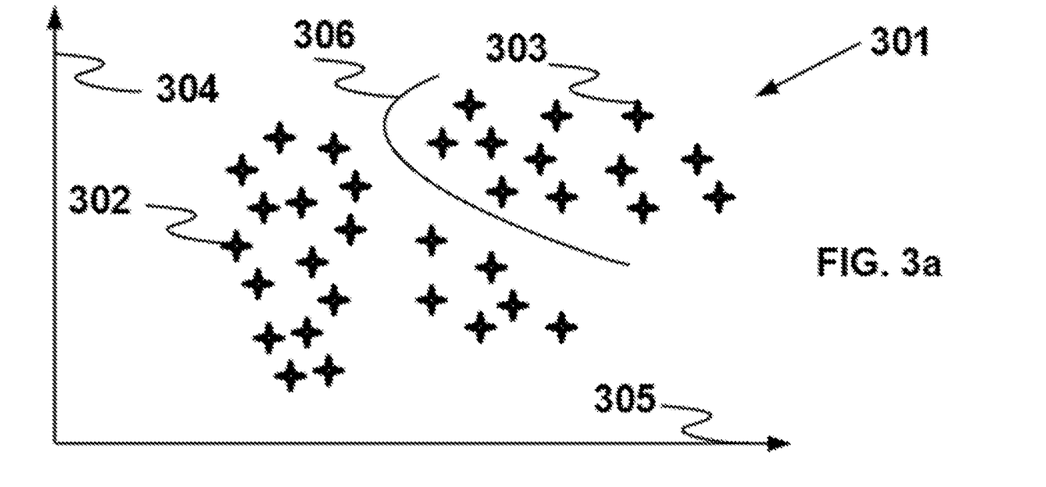
FIGS. 3a-c are schematic representations of examples of determining a label placement according to the method of FIG. 2.

An SVM classification method may aim at defining an optimal hyperplane in an n-classification space, situating data points in different categories depending on which side of the hyperplane they fall. In an example, one or more hyperplanes are defined which correspond to determining a label placement. If a geometrical template would be associated to a specific label placement at a position X (X being for example a 3 dimensional vector comprising positions x, y and z) of the template, and if a hyperplane P corresponds to X=X1 (being a specific position defined by coordinates x1, y1 and z1), the specific geometrical template will be placed on one side of the plane if X>X1 and on the other side of the plane if X<X1. One should understand that such hyperplanes are virtual planes. The SVM classification method can be trained using recommendations of label placement by a designer to locate the hyperplanes such that they follow gaps in the data. For example, if geometrical templates have a label placement X close to an X2 and other geometrical templates have an X value close to an X3 separated from X2 by a wide gap, a hyperplane can be placed between X2 and X3 separating the two groups of templates. Using an SVM will thereby allow classifying templates in various categories according to one or more hyperplanes, each category being associated to a label placement. A symbolic representation 301 limited to two dimensions in FIG. 3a includes a group of templates such as templates 302 or 303 located on a virtual map, for example in function of the volume of the geometrical template along a first axis 304 and in function of the distance between placement of a label and a geometrical center of the corresponding geometrical template along a second axis 305. In the representation 301, template 303, having a volume higher than template 302, would be associated to a label placement further away from its geometrical center than template 302. Using SVM can in this example lead to defining hyperplane 306 leading to classifying the templates in two groups, whereby the group comprising 303 and located on one side of 306 is more likely to indicate the placement of a label closer to its geometrical center than the group comprising 302 and located on the other side of 306. In other examples, such modeling takes place along "n" dimensions and with high sample numbers which do not permit a schematic representation.

Figure 3B:
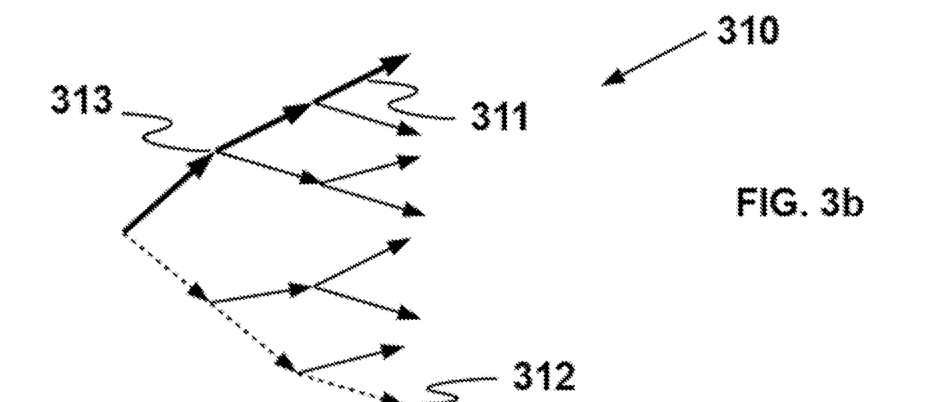

An RF classification method can be described as an ensemble of decision trees where each tree includes branches which allow classifying geometrical templates according to their characteristics, for example in function of their volume. In an example, each template is related to a label placement. In an example, numerous templates are processed by the decision tree, whereby each template data follows its specific path through the decision tree. Templates having the same or similar characteristics will follow the same path within the classification tree. Running such templates through the decision tree therefore leads in a learning phase to identifying the specific branches of the tree being linked to a specific label placement. Such learning phase may take place based on recommendation of label placement from a designer with a number of templates, leading for example to building numerous decision trees with many branches each, including paths that discriminate among different templates and label placements. A symbolic representation in FIG. 3b represents a decision tree 310, whereby path 311 was identified in a learning phase as corresponding to a specific label placement, and whereby path 312 was identified in a learning phase as corresponding to another label placement. At each intersection such as 313 a test such as for example "Is the label placed towards the center of the template" is made. This is of course a symbolic representation and RF processing of label placement can be significantly more complex. In an example, RF processing builds a tree, whereby each branch of the tree represents a template or group of similar templates, whereby each branch is associated to a label placement. Classification may increase in precision as additional templates are processed. This progressive process is referred to as the learning phase, whereby RF classification becomes increasingly trained.

Figure 3C:
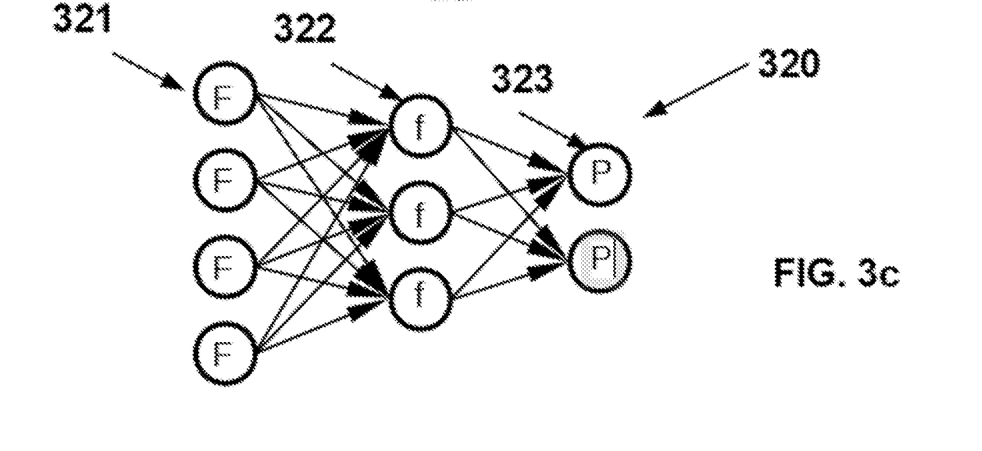

The ANN method can be described as a number of artificial neurons or cells, each cell processing quantitative inputs and providing resulting outputs, the outputs being a mathematical function of the inputs, the mathematical function comprising parameters such as one or more weights, the weights being progressively adjusted as the network (i.e. the plurality of cells) is learning towards reflecting the logical structure of the data. In an example, the input can be the templates, the output being a related label placement. In a first phase, the various mathematical functions may return a first set of label placements which are not in line with appropriate label placements, such that such first set of label placements would be modified by a designer. The ANN method will then adjust the weights of the mathematical functions to adjust label placement towards appropriate label placement. Progressively, the network will reflect a situation corresponding to real label placements provided by the designer, such that label placement may be predicted when newly submitted templates are used as inputs. A symbolic representation in FIG. 3c illustrates ANN process 320, whereby various templates F are used as inputs 321 for cells or artificial neurons 322 including mathematical functions f, the neurons 322 having for example label placement P as outputs 323. Each mathematical function f comprising weights which are adjusted until the artificial neural system reflects a relationship between templates and label placement close to what a designer would recommend.

Geometrical features which may enable training of a model may for example include vertices concentrations, occurrences of edges having a dimension below a given threshold or changes of surface normal above a predetermined threshold, or a combination of these. Training may take place using scanned parts or parts created by CAD (Computer Aided Design) machine readable instructions for example. 3D models or templates according to this disclosure may for example comprise STL (Standard Triangle Language) files Method 200 comprises in block 205 assigning a packing position comprising defining a packing priority for each 3D model, whereby 3D models categorized in the same category are assigned a higher packing priority to be packed together than 3D models categorized in different categories. Such an approach may permit packing together 3D models having similar geometrical characteristics, thereby providing the opportunity to tune manufacturing conditions of 3D printing modes to such geometric characteristics. Example of printing modes may comprise a fast printing mode, a single pass printing mode, a double pass printing mode or a multiple pass printing mode. A number of passes may refer to a number of passes of fusing and/or detailing agents.

Figure 4:
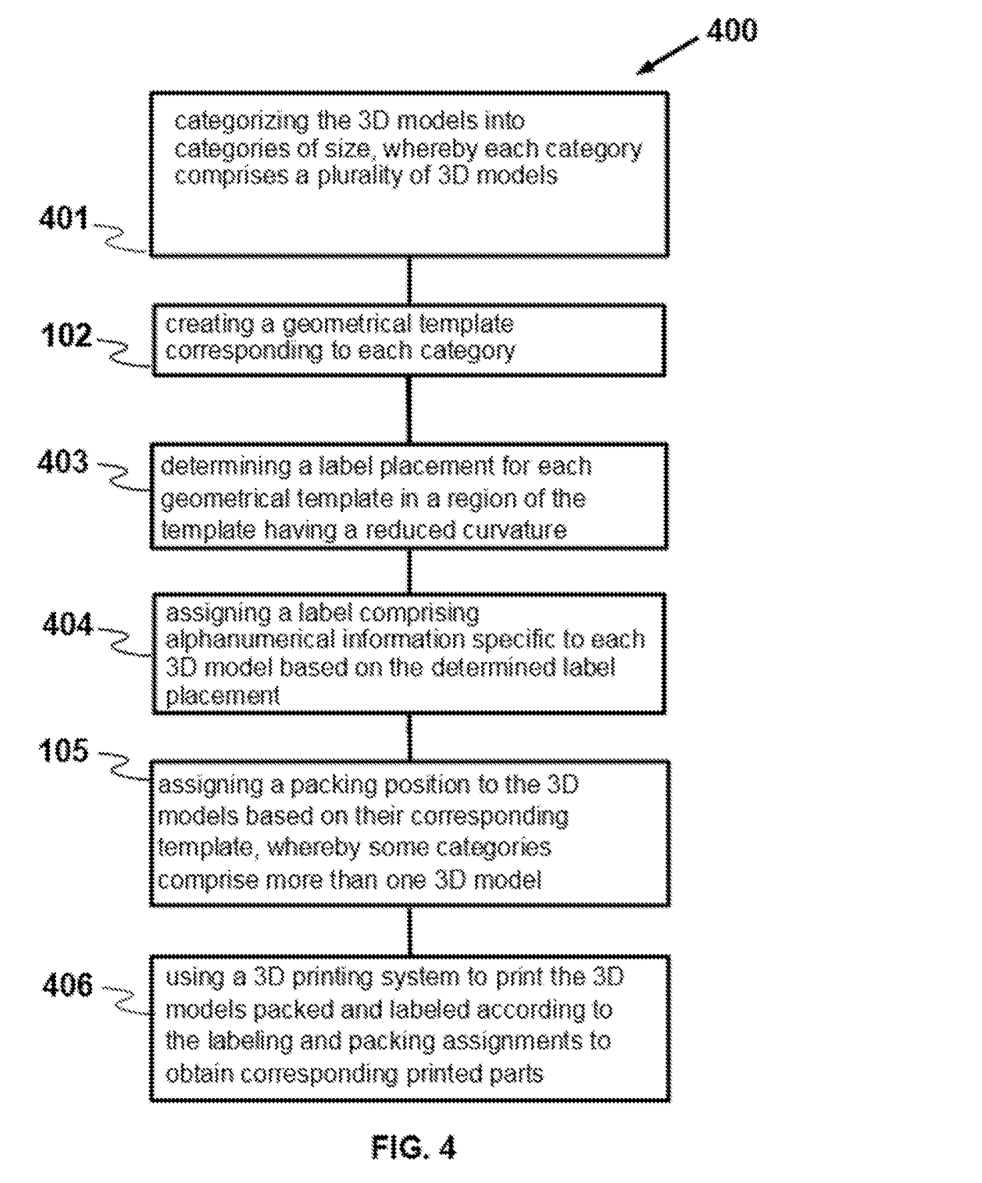
FIG. 4 is a schematic illustration of a further example method according to the present disclosure.

FIG. 4 illustrates another method 400 according to this disclosure. Some blocks of FIG. 4 such as blocks 102 and 105 may operate in the same manner as the corresponding blocks of FIG. 1 and are therefore marked with the same reference number and not described in detail.

Method 400 comprises in block 401 categorizing the models into categories of size, or on a 3D model size. In an example, 3D models are categorized by size in function of the relative size of the models compared to a label size. This may permit classifying in different categories 3D models relatively large compared to a label size, for example 3D model having a surface more than two order of magnitude larger than a label surface, such that label placement may be less complex for such 3D models having a relatively large size, whereas 3D models having a relatively smaller size, such as for example a 3D model surface of less than one order of magnitude of a label surface for which label placement may be more complex to assign.

Method 400 comprises in its block 401 categorizing the 3D models, whereby each category comprises a plurality of 3D models. This may reinforce the efficiency of the method of this disclosure by avoiding to have one or more categories having a single corresponding 3D model, or even no 3D model at all.

Method 400 comprises in block 403 determining a label placement for each template comprises identifying a region of the template having a more reduced surface curvature (i.e. being "more flat") compared to the curvature of other regions of the template. Operating in such a manner may permit identifying a region which would be relatively flat and therefore particularly suitable to placement of a label.

Method 400 comprises in block 404 assigning a label to each 3D model based on the determined label placement, whereby each label comprises alphanumerical information specific to each 3D model. Labels may indeed permit identifying a specific part in which case each label may comprise a specific alphanumerical chain of characters. Labels may in other examples comprise bar code information or other codified information suitable for part identification.

Method 400 comprises in block 406 using a 3D printing system or 3D printer to print the 3D models packed and labelled according to the labelling and packing assignments to obtain corresponding printed parts. An example 3D printing system may comprise include a build area platform that includes a build area surface on which three-dimensional (3D) objects or parts are to be generated from a build material. Particularly, the 3D parts may be generated within a build envelope, which is equivalently referenced herein as a build volume. The build envelope may occupy a three-dimensional space on top of the build area surface of the build area platform. For instance, the build envelope may be defined as the three-dimensional space in which the 3D printer may print or otherwise generate the parts as part of a batch in which the packing according to this disclosure occurs. The width and the length of the build envelope may be limited by the width and the length of the build area platform and the height of the build envelope may be limited by the extent to which the build area platform may be moved in the z direction. A 3D printer may print multiple parts during a common printing operation, i.e., a single building operation within a build envelope. According to an example of this disclosure, determining an arrangement of the parts to be printed in the build envelope, or packing, that results in the efficiency with which the parts are printed being enhanced or substantially optimized. The arrangement of the parts may include the placements of the parts in the x, y, and z directions as well as rotations of the parts, e.g., yaw, roll, and pitch, that result in the enhancement in efficiency. In one example, the efficiency may be considered to be enhanced or substantially optimized when the 3D printer is able to print a maximum or near maximum number of parts during a single printing operation. In another example, the efficiency may be considered to be enhanced or substantially optimized when a plurality of parts are able to be printed in a minimized or near minimized amount of time during a single printing operation. In a further example, the efficiency may be considered to be enhanced or substantially optimized when the 3D printer is able to print all of a plurality of parts in a single or in a minimized number of printing operations. It should be understood that a 3D printer may have any of a plurality of different configurations and may use any of a number of different additive manufacturing techniques to build or print parts. For instance, a 3D printer 100 may employ any of multijet fusion, selective laser sintering, selective laser melting, stereolithography, etc. Thus, for instance, various types of materials, e.g., power-based, liquid-based, etc., may be used in a 3D printer. It should be understood that 3D printers having different configurations may implement the determined arrangements, or packing, of the parts, or 3D models, to be printed. Other types of additive manufacturing systems on which features disclosed herein may be employed include systems that employ selective laser sintering, selective laser melting, stereolithography, etc.

Figure 5:
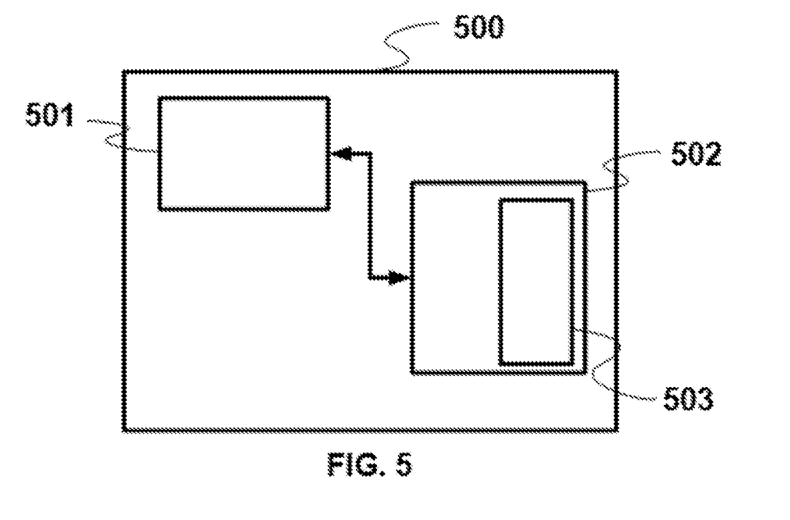
FIG. 5 is a block diagram of an example apparatus according to the present disclosure.

FIG. 5 is a block diagram of an example apparatus 500 according to the present disclosure. Such an apparatus may be comprised in a 3D printing system or external to a 3D printer. The apparatus 500 may be a computing device or a controller, such as a personal computer, a server computer, a printer, a 3D printer, a smartphone, a tablet computer, etc. The apparatus 500 is depicted as including a processor 501 and a machine-readable storage medium or data storage 502 coupled to the processor. The processor 501 may be any of a central processing unit (CPU), a semiconductor-based microprocessor, an application specific integrated circuit (ASIC), and/or other hardware device suitable for retrieval and execution of instructions stored in the machine-readable storage medium or data storage 502. The processor 501 may fetch, decode, and execute instructions of an instruction set 503 stored on the machine-readable storage medium 502 to cooperate with the processor 501 and the data storage 502 according to this disclosure to group the 3D models into geometrical characteristic categories corresponding to a common geometrical template; determine a label placement region for each template, create modified 3D models comprising a label on the label placement region, and pack the modified 3D models based on their common geometrical template. Using a common geometrical template may reduce the computational resources to create the modified 3D models whereby the label placement determination is made for each template instead of being made for each 3D model.

Figure 6A:
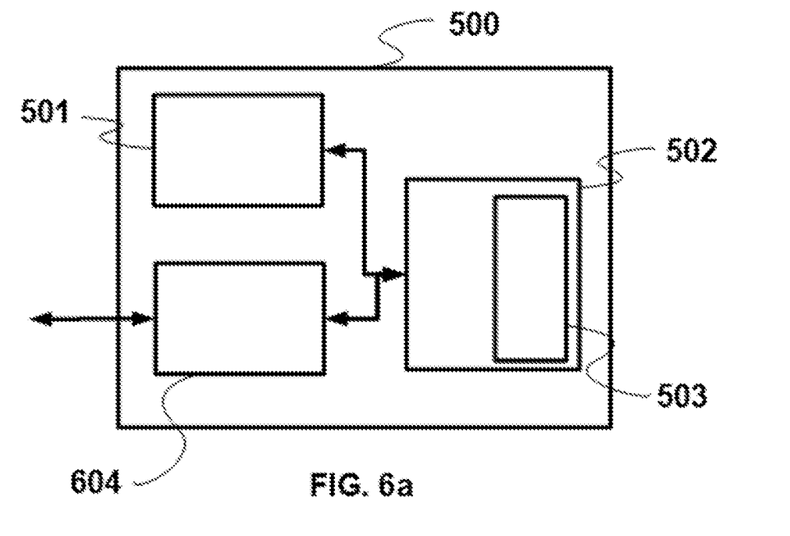
FIG. 6a is a block diagram of another example apparatus according to the present disclosure.

In an example illustrated on FIG. 6a, the apparatus 500 may be such that the instruction set is to generate a recommendation of a label assignment, provide the recommendation to a designer using a machine learning method prior to determining the label placement region, the machine learning method being modified if the recommendation is modified by the designer. Such machine learning method may be encoded by instructions comprised in the instruction set. In an example, the label placement region is determined based on the region as modified by the designer, for example during a learning phase of the machine learning, thereby potentially improving future determinations of label placement according to this disclosure. Communication with a designer may take placed through an input and output interface 604 through which the processor 501 may communicate with an external device(s) (not shown), for instance, to receive and store the information exchanged with the designer through an external device such as a graphical user interface. The input/output interface 604 may include hardware and/or machine readable instructions to enable the processor 501 to communicate with the external device(s). The input/output interface 604 may enable a wired or wireless connection to the output device(s). The input/output interface 604 may further include a network interface card and/or may also include hardware and/or machine readable instructions to enable the processor 501 to communicate with various input and/or output devices, such as a keyboard, a mouse, a display, another computing device, etc., through which a designer may receive information and input instructions into the apparatus 500.

Figure 6B:
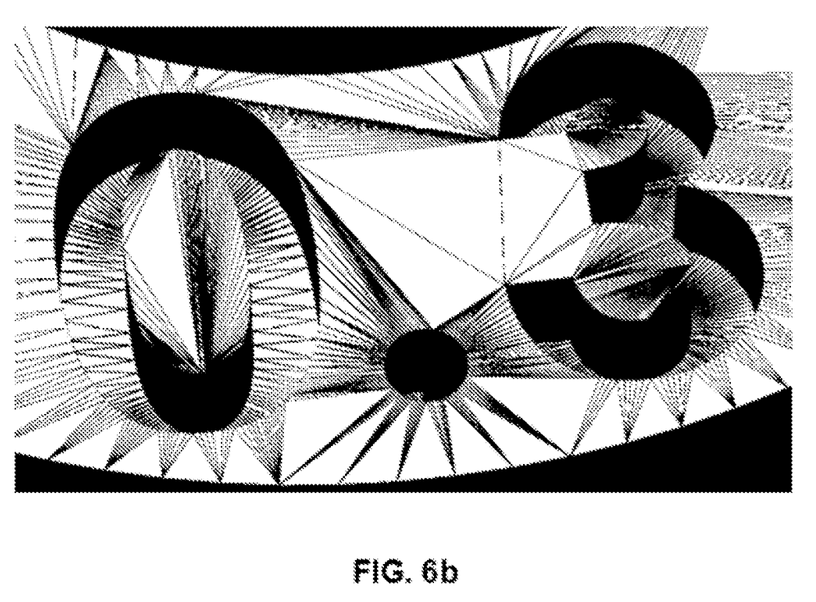

The machine-readable storage medium or data storage 502 may be any electronic, magnetic, optical, or other physical storage device that contains or stores executable instructions. Thus, the machine-readable storage medium 502 may be, for example, Random Access Memory (RAM), an Electrically Erasable Programmable Read-Only Memory (EEPROM), a storage device, an optical disc, and the like. In some implementations, the machine-readable storage medium 502 may be a non-transitory machine-readable storage medium, where the term "non-transitory" does not encompass transitory propagating signals. Machine-readable storage medium 502 may be encoded with a series of instructions executable by a processor 501 to group data files representing three dimensional (3D) models into categories corresponding to a common geometrical template, determine a label placement region for each template, create modified data files representing modified 3D models comprising a label on the label placement region and create a packed data file by combining the modified data files based on their category. Such a pack data file may comprise the data corresponding to the 3D models in a packed configuration. In an example, storage medium 502 further comprises instructions to modify a machine learning method according to this disclosure if a label placement region is modified by a designer. FIG. 6b illustrates a modification of a data file representing an example 3D model according to disclosure, whereby the data file has been modified to include a label comprising alphanumerical characters "0.3", thereby illustrating the potential computational complexity implied by such a modification of a 3D model, the modification comprising introducing a mesh leading to including the label information into the modified 3D model. This relatively simple example may illustrate how the features of this disclosure may avoid complex computational operations on a per-model basis when determining label placement.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method for processing three dimensional (3D) models comprising:
    categorizing the 3D models into geometrical characteristic categories, each category comprising a plurality of 3D models to be translated into tangible 3D parts for additive printing;
    creating a geometrical template corresponding to each category, the geometrical template comprising geometrical commonalities to the plurality of 3D models of the corresponding category, wherein the geometrical template is to both label and pack an entirety of the 3D models for the additive printing;
    determining a 3D print label placement for each geometrical template;
    assigning a 3D print label to each 3D model based on the determined label placement;
    assigning a preliminary packing position to the 3D models based on their corresponding geometrical template; and
    determining a final packing position for each 3D model by replacing the geometrical template for each 3D model with the 3D model.

2. A method according to claim 1, whereby determining a 3D print label placement comprises generating a recommendation for a label placement using a machine learning method, providing the generated recommendation to a designer, and modifying the machine learning method if the recommendation is modified by the designer.

3. A method according to claim 1, whereby assigning a preliminary packing position comprises defining a packing priority for each 3D model, whereby 3D models categorized in the same category are assigned a higher packing priority to be packed together than 3D models categorized in different categories.

4. A method according to claim 1, whereby the number of categorized 3D models is an order of magnitude higher than the number of categories.

5. A method according to claim 1, whereby geometrical characteristic categories are based on a 3D model shape.

6. A method according to claim 1, whereby geometrical characteristic categories are based on a 3D model size.

7. A method according to claim 1, whereby determining a 3D print label placement for each template comprises identifying a region of the template having a curvature more reduced than the curvature of other regions of the template.

8. A method according to claim 1 comprising using a 3D printing system to print the 3D models packed and labelled according to the labelling and packing assignments to obtain corresponding printed parts.

9. A method according to claim 1, whereby each label comprises alphanumerical information specific to each 3D model.

10. An apparatus for processing three dimensional (3D) models comprising a processor, a data storage coupled to the processor and an instruction set to cooperate with the processor and the data storage to:
    group the 3D models into geometrical characteristic categories to be translated into tangible 3D parts for additive printing, each category comprising a plurality of 3D models, corresponding to a common geometrical template, the common geometrical template comprising geometrical commonalities to the plurality of 3D models of the corresponding category, wherein the common geometrical template is to both label and pack an entirety of the 3D models for the additive printing;
    determine a 3D print label placement region for each template;
    create modified 3D models comprising a 3D print label on the label placement region; and
    pack the modified 3D models based on their common geometrical template, wherein pack the modified 3D models assigns a preliminary packing position to the 3D models and further determines a final packing position for each 3D model by replacing the geometrical template for each 3D model with the 3D model.

11. The apparatus according to claim 10, whereby the instruction set is to generate a recommendation of a 3D print label assignment, provide the recommendation to a designer using a machine learning method prior to determining the label placement region, the machine learning method being modified if the recommendation is modified by the designer.

12. The apparatus according to claim 11, whereby the label placement region is determined based on the region as modified by the designer.

13. A non-transitory machine-readable storage medium encoded with instructions executable by a processor, the machine-readable storage medium comprising instructions to:
    group data files representing three dimensional (3D) models into categories to be translated into tangible 3D parts for additive printing, each category comprising a plurality of 3D models, corresponding to a common geometrical template, the common geometrical template comprising geometrical commonalities to the plurality of 3D models of the corresponding category, wherein the common geometrical template is to both label and pack an entirety of the 3D models for the additive printing;
    determine a label placement region for each template;
    create modified data files representing modified 3D models comprising a 3D print label on the label placement region; and
    create a packed data file by combining the modified data files based on their category, where create a packed data file assigns a preliminary packing position to the 3D models based on their corresponding geometrical template and a packing priority and determining a final packing position for each 3D model by replacing the geometrical template for each 3D model with the 3D model.

14. A storage medium according to claim 13, further comprising instructions to modify a machine learning method if a label placement region is modified by a designer.

* * * * *